(12) United States Patent
Goodman-Strauss et al.

(10) Patent No.: US 11,691,375 B2
(45) Date of Patent: Jul. 4, 2023

(54) METHOD OF EFFICIENTLY CONSTRUCTING NEGATIVELY CURVED SURFACES FROM FLAT MATERIAL

(71) Applicant: BOARD OF TRUSTEES OF THE UNIVERSITY OF ARKANSAS, Fayetteville, AR (US)

(72) Inventors: Chaim Goodman-Strauss, Fayetteville, AR (US); Eugene Sargent, Fayetteville, AR (US)

(73) Assignee: Board Of Trustees Of The University Of Arkansas, Fayetteville, AR (US)

( * ) Notice: Subject to any disclaimer, the term of this patent is extended or adjusted under 35 U.S.C. 154(b) by 729 days.

(21) Appl. No.: 16/675,106

(22) Filed: Nov. 5, 2019

(65) Prior Publication Data

US 2020/0139659 A1     May 7, 2020

Related U.S. Application Data

(60) Provisional application No. 62/755,891, filed on Nov. 5, 2018.

(51) Int. Cl.
| | | |
|---|---|---|
| A63H 33/08 | (2006.01) | |
| B31D 5/00 | (2017.01) | |
| B32B 3/06 | (2006.01) | |
| A63H 33/00 | (2006.01) | |
| H01M 8/0656 | (2016.01) | |

(52) U.S. Cl.
CPC ............. *B31D 5/00* (2013.01); *B32B 3/06* (2013.01); *A63H 33/00* (2013.01); *A63H 33/086* (2013.01); *H01M 8/0656* (2013.01)

(58) Field of Classification Search
None
See application file for complete search history.

(56) References Cited

U.S. PATENT DOCUMENTS

| | | | |
|---|---|---|---|
| 9,896,835 B2 | 2/2018 | Hauptman et al. | |
| 2005/0287906 A1* | 12/2005 | He | A63H 33/082 446/109 |

OTHER PUBLICATIONS

Henderson; Differenetial Geometry A Geometric Instroduction; Self Study third Edition, Jul. 2013; Cornell University; 7 pages.
Delp et al; Playing with Surfaces: Spheres, Monkey Pants, and Zippergons; Proceedings of Bridges 2011: Mathematics, Music, Art, Architecture, Culture (2011).
Dudte et al; Programming curvature using origami tessellations; Nature Materials; Articles; Jan. 25, 2016; DOI: 10.1038/NMAT4540; Macmillan Publishers Limited; 30 pages.

\* cited by examiner

*Primary Examiner* — Alexander S Thomas
(74) *Attorney, Agent, or Firm* — Keith A. Vogt; Keith Vogt Ltd.

(57) ABSTRACT

An object having a plurality of negative curvatures comprising a plurality of planar sections adjoined together by locking segments.

21 Claims, 2 Drawing Sheets

METHOD OF EFFICIENTLY CONSTRUCTING NEGATIVELY CURVED SURFACES FROM FLAT MATERIAL

RELATED APPLICATIONS

This application claims priority to U.S. Provisional Application Ser. No. 62/755,891 filed Nov. 5, 2018, which is incorporated herein in its entirety.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

The "curvature" of a surface can be measured at every point upon it and any material that flexes but does not stretch, such as paper, steel or (to a varying extent) fabric, must maintain its curvature at each point as it is manipulated in space. "Flat" or "zero curvature" materials such as paper and steel can be rolled into tubes or cones, and these are "flat" or "zero"-curvature surfaces.

Surfaces of non-zero curvature may be stitched together along seams from flat pieces—clothes are a marvelous example—but in general, there has not been an efficient means of constructing surfaces of (controlled, or constant) negative curvature by assembling pieces of flat material.

Surfaces of negative curvature are familiar in everyday life: a surface has "negative curvature" at a point if it is saddle-like there, and the more negative it is, the more extreme this saddle is. A surface with negative curvature is ruffly like lettuce and has a tremendous amount of surface area for the volume it occupies. Surfaces of negative curvature are graceful and sensuous, appearing throughout the natural world.

As a material, surfaces of negative curvature have surprising dynamical properties when manipulated. Small perturbations in one area lead to cascading global effects, sometimes gently, sometimes dramatically; this is exploited in nature by nudibranchs, sea slugs, in their frilly movements).

The mathematical theory of the curvature of surfaces has been studied for more than 200 years. But many basic, deep open questions remain, particularly with regarding the physical arrangement of this as material—for example, no theory of the dynamical behavior of such surfaces has appeared as yet.

BRIEF SUMMARY OF THE INVENTION

In one embodiment, the present invention provides a method, approach, device and system concerning an efficient assembly of surfaces of negative curvature from flat pieces of material. Such surfaces like lettuce, that are frilly or ruffly, have a tremendous amount of surface area in a small volume). Such surfaces have useful mechanical and physical properties.

In another embodiment, the present invention provides a method, approach, device, and system that has consumer and industrial applications such as filters, lamps, sculptures, and toys.

In another embodiment, the present invention provides a method, approach, device, and system concerning an efficient assembly of surfaces for use in applications in which a large amount of surface area must be constructed in a relatively small volume, such as a catalytic converter or a solar water splitter for a hydrogen fuel cell.

In the embodiment concerning a toy, the present invention creates a toy that is novel and in which the pieces are fun to handle, and the result is a colorful and beautiful sculpture made at home, in the classroom, or at a science museum. It may also be waterproof and the same material as many pool toys.

In another embodiment, the present invention provides a practical method of using flat material (steel, paper, foam) for creating surfaces of negative curvature, controlling the degree of curvature or holding it constant, without any need of computer-controlled fabrication, 3D printing, etc.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 1A:
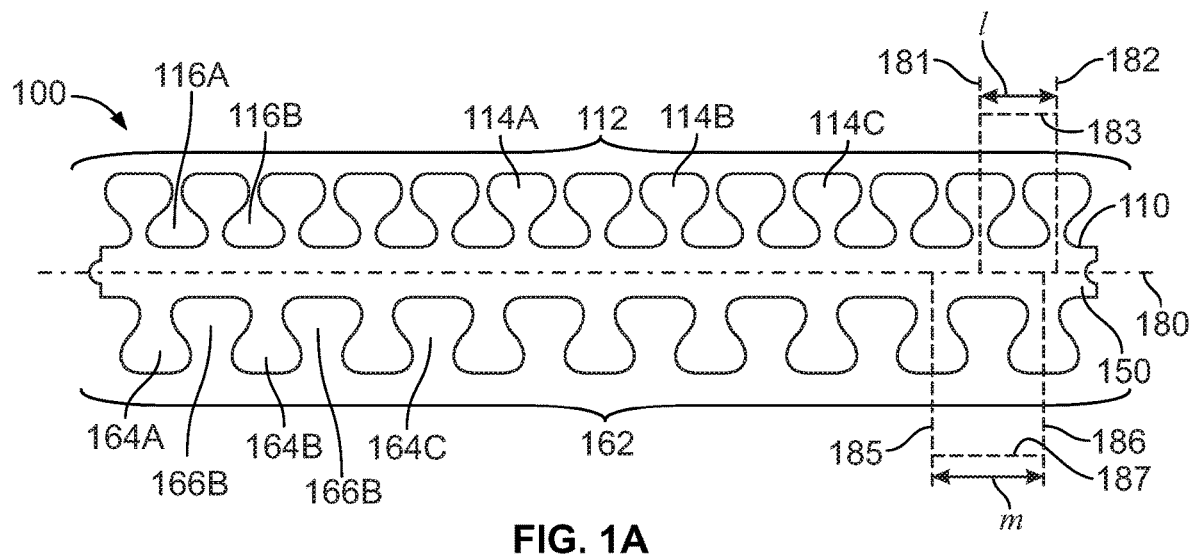
FIG. 1A illustrates an elongated planar section that may be used with an embodiment of the present invention.
Figure 1B:
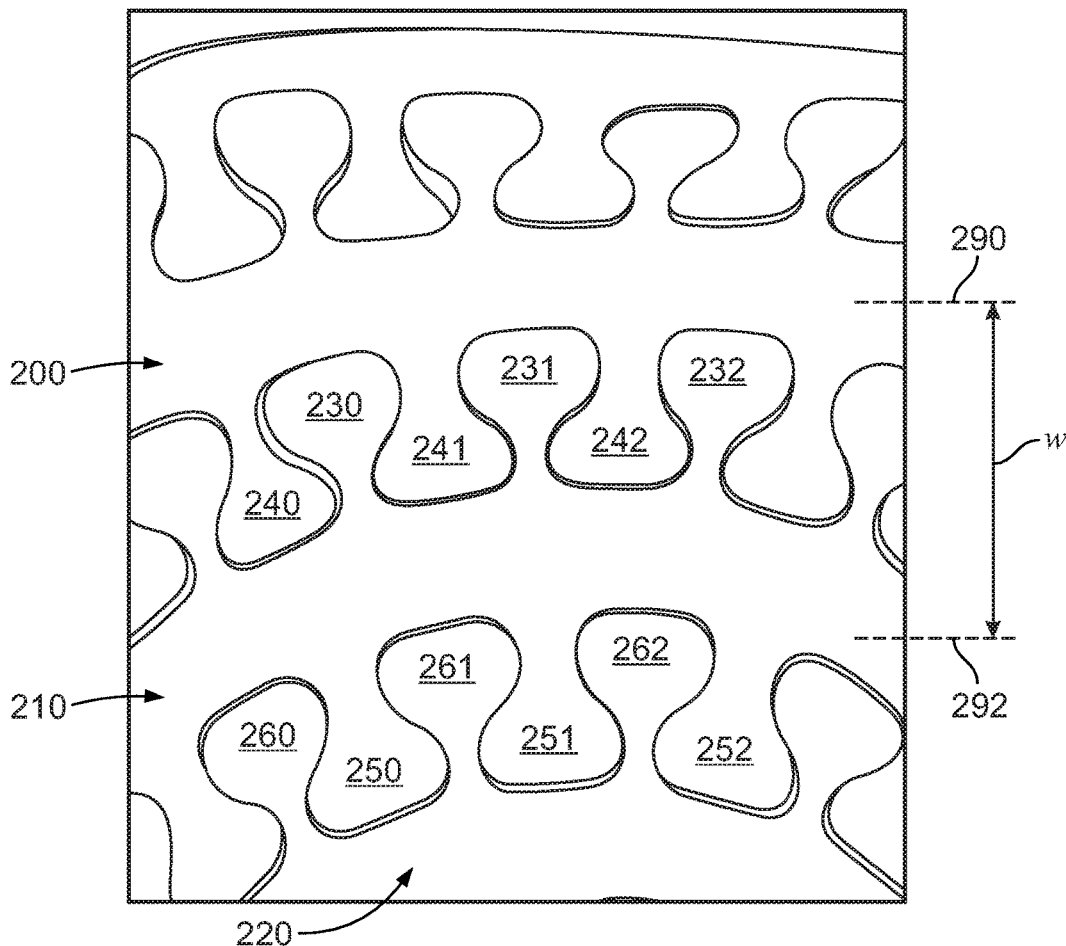
FIG. 1B illustrates how elongated planar sections may be attached together for an embodiment of the present invention.
Figure 2:
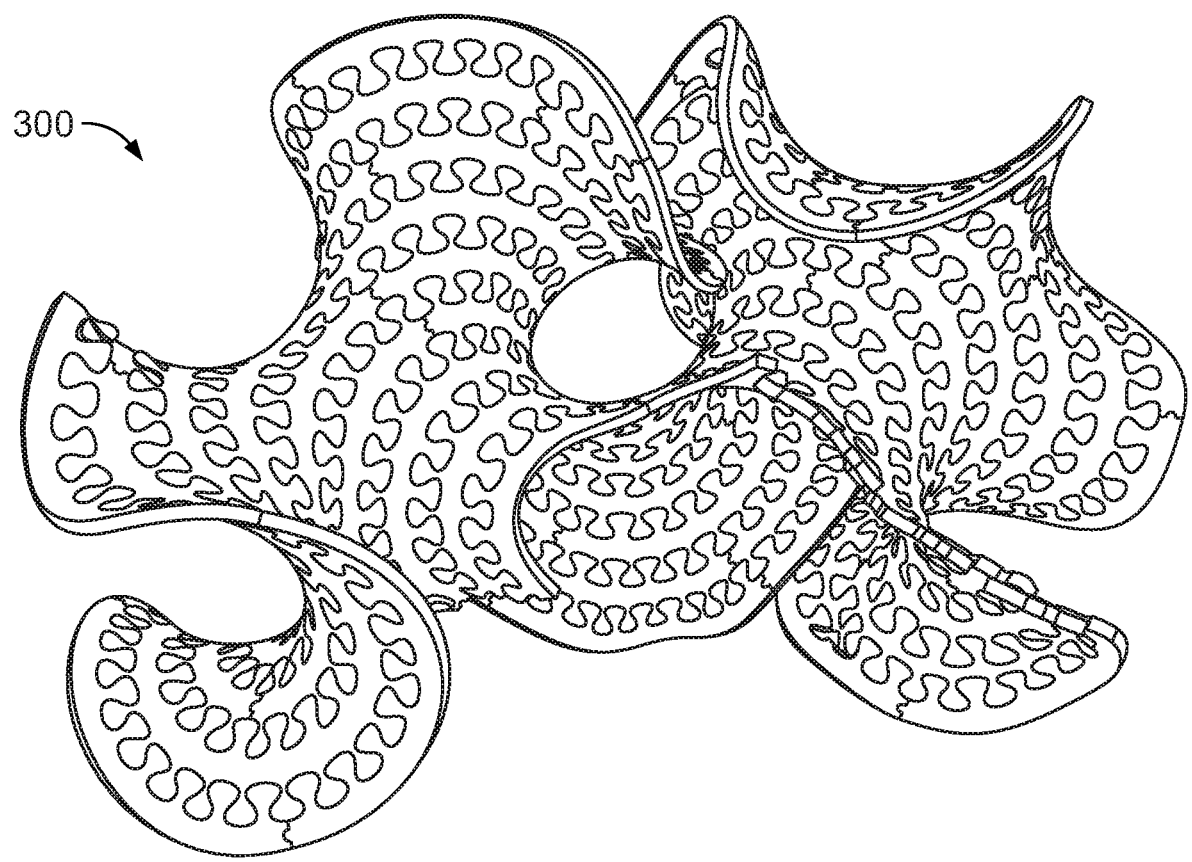
FIG. 2 illustrates an exemplary shape that may be achieved with the embodiments of the present invention.

The present invention provides a method, approach, device, and system, as shown in FIGS. 1A and 1B, that takes a flat material, such as steel, paper, cloth or foam, and forms it into strips with attachments of varied spacing on either side to create an object. As shown in FIG. 2, the resulting structure has a number of regions of different negative curvature.

In a preferred embodiment, as shown in FIGS. 1A and 1B, the assembly of surfaces of negative curvature may be accomplished by providing a planar section 100 having a first edge 110 and opposing second edge 150. First edge 110 having a first set of locking segments 112 comprised of a plurality repeating shapes 114A-114C which may or may not be the same shape with each shape defining a plurality of openings 116A and 116B which may or may not be the same shape.

Second edge 150 having a second set of locking segments 162 comprised of a plurality repeating shapes 164A-164C which may or may not be the same shape and the shapes define a plurality of openings 166A and 166B which may or may not be the same shape.

In other embodiments of the present invention, shapes 114A-114C are of a different configuration than shapes 116A-164C. Shapes 114A-114C and shapes 116A-164C also may be interlocking and configured as teeth.

In yet other embodiments of the present invention, shapes 114A-114C and openings 166A-166B may be the same or complementary. Shapes 164A-164C and openings 116A-116B may also be the same or complementary.

In one preferred embodiment, planar section has a centerline w 180 as shown in FIG. 1A. In addition, the repeating shapes on first edge 110 have a consistent predetermined, equal spaced distanced apart l which is represented as line 183. Distance l is measured by the distance between lines line 181 and 182 with each line being located in the center of a pair of adjoining shapes and which are perpendicular to line w 180. The repeating shapes on second edge 120 also have a consistent predetermined, equal spaced distanced apart m which is represented as line 187. Distance m is measured by the distance between lines line 185 and 186 with each line being located in the center of a pair of adjoining shapes and which are perpendicular to line w 180. Lastly, distance l does not equal distance m.

In some embodiments, l/m and the strip width are constant. However, the configuration of the shapes might vary and the spacing between the shapes may vary. Also, the ratio l/m is not necessarily constant and the strip width may vary as well. This allows variation in the curvature, and a much wider range of surfaces that may be built using the embodiments of the present invention.

In a preferred embodiment, as shown in FIG. 1B, a plurality of strips 200, 210 and 220 are provided which use the design of planar section 100. Strips 200, 210 and 220 may be attached to one another lengthwise as needed and are attached side by side.

Attachment of strip 200 to strip 210 is accomplished by inserting shapes 240-242 of strip 200 into the openings defined by shapes 230-232 of strip 210. Strip 210 is connected to strip 220 by inserting shapes 250-252 of shape 210 into the openings defined by shapes 260-262 of strip 220. This process is then repeated for the attachment of multiple strips together.

The curvature of the surface at the point of attachment of two strips may be precisely controlled by the difference in the spacing of the attachments on the two strips. For constant negative curvature, the spacing is different, but constant, on either side. As more rows of strips are added, the resulting surface must bend and then buckle, by mathematical necessity, forming a material with negative curvature, which may be varied (even on a single strip) by changing the spacing of the attachments. If the strips are w units wide (measured from centerline 290 of strip 200 to centerline 292 of adjoining strip 210 as shown in FIG. 1B), with attachments l and m apart, respectively to either side, then the Gaussian curvature in that region will be $$-\left(\frac{2(l-m)}{w(l+m)}\right)^2$$

per unit of area.

The resulting surface, as a material, may then manipulated into a variety of forms (of the same curvature).

The method is highly efficient in its use of material, as straight strips are efficiently cut from flat stock. The straight strips may be rolled up for efficient handling, and the surface may be assembled mechanically, just by unrolling a strip against a leading edge of the surface, stitching together the attachments one by one. The assembly is parallelizable, as this may be carried out anywhere and everywhere on the leading edge simultaneously.

The stresses upon the material, once in fixed form, are minimal enough that no glue is necessary for the foam implementation of the method, once the strips have been attached end-to-end.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A method for the assembly of surfaces of negative curvature comprising the steps of:
   providing plurality of planar sections, each planar section having a first edge and opposing second edge;
   said first edge having a first set of locking segments;
   said first set of locking segments comprising a plurality repeating shapes with each shape defining a plurality of openings;
   said second edge having a second set of locking segments;
   said second set of locking segments comprising a plurality repeating shapes with each shape defining a plurality of openings;
   said first set of locking segments have a different shape than said second set of locking segments; and
   creating a negative curvature by attaching said planar sections together by inserting said first set of locking segments into the openings defined by a second set of locking segments of an adjoining planar section and by inserting said second set of locking segments into the openings defined by a first set of locking segments of an adjoining planar section.

2. The method of claim 1 wherein said first set of locking segments are equally spaced a distance l apart.

3. The method of claim 2 wherein said second set of locking segments are equally spaced a distance m apart.

4. The method of claim 3 wherein l does not equal m.

5. The method of claim 4 each planar section has a centerline and distance between the centerline of a pair of adjoining planar section is w.

6. The method of claim 5 wherein the Gaussian curvature in a region of adjoining planar sections is $$\left(\frac{2(l-m)}{w(l+m)}\right)^2$$

per unit of area.

7. The method of claim 5 wherein negative curvature is varied by changing l of an adjoining planar section.

8. The method of claim 5 wherein negative curvature is varied by changing m of an adjoining planar section.

9. The method of claim 5 wherein negative curvature is varied by changing l and m of an adjoining planar section.

10. The method of claim 2 wherein said first set of locking segments have the same shape.

11. The method of claim 3 wherein said second set of locking segments have the same shape.

12. An object having a plurality of negative curvatures comprising:
  a plurality of curved sections, each curved section having a first edge and opposing second edge;
  said first edge having a first set of locking segments;
  said first set of locking segments comprising a plurality repeating shapes with each shape defining a plurality of openings;
  said second edge having a second set of locking segments;
  said second set of locking segments comprising a plurality repeating shapes with each shape defining a plurality of openings;
  said first set of locking segments have a different shape than said second set of locking segments; and
  said curved sections attached together by inserting said first set of locking segments into the openings defined by a second set of locking segments of an adjoining curved section and said second set of locking segments inserted into the openings defined by a first set of locking segments of an adjoining curved section.

13. The object claim 12 wherein said first set of locking segments are equally spaced a distance l apart.

14. The object of claim 13 wherein said second set of locking segments are equally spaced a distance m apart.

15. The object of claim 14 wherein l does not equal m.

16. The object of claim 15 wherein each curved section has a centerline and distance between the centerline of a pair of adjoining curved section is w.

17. The object of claim 16 wherein the Gaussian curvature in a region of adjoining curved sections is $$\left(\frac{2(l-m)}{w(l+m)}\right)^2$$

per unit of area.

18. The object of claim 15 wherein negative curvature is varied by changing l of an adjoining curved section.

19. The object of claim 15 wherein negative curvature is varied by changing m of an adjoining curved section.

20. The object of claim 15 wherein negative curvature is varied by changing l and m of an adjoining curved section.

21. The object of claim 15 wherein said first set of locking segments have the same shape and said second set of locking segments have the same shape.

* * * * *